United States Patent [19]
Hall

[11] Patent Number: 5,253,939
[45] Date of Patent: Oct. 19, 1993

[54] HIGH PERFORMANCE BEARING PAD FOR THRUST BEARING

[75] Inventor: David R. Hall, Provo, Utah

[73] Assignee: Anadrill, Inc., Houston, Tex.

[21] Appl. No.: 797,132

[22] Filed: Nov. 22, 1991

[51] Int. Cl.$^5$ ............................................. F16C 17/04
[52] U.S. Cl. ...................................... 384/303; 384/123
[58] Field of Search ................. 384/303, 95, 121, 42, 384/123

[56] References Cited

U.S. PATENT DOCUMENTS

| | | | |
|---|---|---|---|
| 3,745,623 | 7/1973 | Wentorf, Jr. et al. | 29/95 |
| 4,329,127 | 5/1982 | Tschirky et al. | 418/48 |
| 4,345,798 | 8/1982 | Cortes . | |
| 4,410,054 | 10/1983 | Nagel et al. | 175/107 |
| 4,451,162 | 5/1984 | Shepherd | 384/95 |
| 4,468,138 | 8/1984 | Nagel | 384/303 |
| 4,525,178 | 6/1985 | Hall | 51/309 |
| 4,560,014 | 12/1985 | Geczy | 175/107 |
| 4,604,106 | 8/1986 | Hall | 51/293 |
| 4,620,601 | 11/1986 | Nagel | 175/107 |
| 4,629,373 | 12/1986 | Hall | 407/118 |
| 4,639,146 | 1/1987 | Yoshioka et al. | 384/99 |
| 4,657,090 | 4/1987 | Geczy | 175/92 |
| 4,665,997 | 5/1987 | Maurer et al. | 175/107 |
| 4,708,496 | 11/1987 | McPherson | 384/303 |
| 4,710,036 | 12/1987 | Geczy | 384/275 |
| 4,720,199 | 1/1988 | Geczy et al. | 384/282 |
| 4,729,440 | 3/1988 | Hall | 175/107 |
| 4,729,675 | 3/1988 | Trzeciak et al. | 384/613 |
| 4,732,364 | 3/1988 | Seger et al. | 251/369 |
| 4,732,491 | 3/1988 | Geczy | 384/95 |
| 4,789,251 | 12/1988 | McPherson et al. | 384/317 |

OTHER PUBLICATIONS

Tiraspolsky, Wladimir, *Hydraulic Downhole Drilling Motors: Turbodrills and Positive Displacement Rotary Motors*, Gulf Publishing Company, 1985.
United States Defensive Publication No. T102,901 to Offenbacher (Apr. 5, 1983).

Primary Examiner—Lenard A. Footland
Attorney, Agent, or Firm—Kent S. Burningham; John J. Ryberg; Wayne I. Kanak

[57] ABSTRACT

Cylindrical bearing pads are insertable into bearing pad recesses formed in a receiving surface of a bearing pad retainer in a load-carrying structure. The bearing pads have an insertion end which is fixed into the bearing pad recess by brazing or by interference fitting and a bearing end which projects from the receiving surface and terminates in a bearing face. The bearing face has a periphery which encircles the bearing face and an indentation having a perimeter formed centrally in the bearing face. An annular flattened area encircles the indentation forming an effective bearing contact area between an outer border of the flattened area and the perimeter of the indentation. When the indentation is filled with drilling fluid, lubrication is provided to an opposed bearing face of an opposing bearing pad. The indentation can be filled with drilling fluid or some other material with a higher heat storage capacity than polycrystalline diamond to provide temperature modulation for storing heat produced at the bearing face. When filled with a material, the indentation also serves to dissipate heat to reducing the length of a path of heat when the heat is conducted to cooler areas of the bearing face. Alternate embodiments include bearing faces with single or plural indentations of various shapes.

26 Claims, 12 Drawing Sheets

HIGH PERFORMANCE BEARING PAD FOR THRUST BEARING

BACKGROUND

1. Field of the Invention

This invention relates to improvements in the structure of thrust bearings. More particularly, this invention relates to improvements in the structure of the bearing faces of the bearing pads used in thrust bearings employed in downhole drilling operations as well as to a process for manufacturing such bearing pads.

2. Background

Bore holes are drilled in the earth to gain access to materials located therein. The cost of drilling equipment is high, however, and therefore, many companies prefer to lease exploratory equipment for short-term or sporadic needs. Although less expensive than purchasing exploratory equipment, leased drilling equipment nevertheless requires skilled manpower, frequent maintenance, and large quantities of drilling fluid to cool bearings and drill bits and to wash debris out of the bore hole. These factors of overhead contribute to the high cost of leasing exploratory equipment. Any down-time from equipment failure or maintenance impinges on the time this expensive equipment is in productive use.

A. THE EXPLORATORY ENVIRONMENT

To illustrate the environment in which exploration takes place, FIG. 1 shows a drill rig 10, drilling a bore hole 11 into a surface 12 of the earth at a site to be explored for oil. Bore hole 11 is drilled below drill rig 10 through surface 12 and strata 13, to a desired depth.

A drill bit 15 is powered by a downhole drilling motor 16. Downhole drilling motor 16 is located at the end of a series of pipe sections comprising drill string 18. The housing of downhole drilling motor 16 is located in drilling end 14 of drill string 18 and remains stationary with drill string 18 as drilling motor 16 powers drill bit 15. Downhole drilling motor 16 is powered by drilling fluid, commonly referred to as drilling mud, which is pumped under pressure through drill string 18 and through downhole drilling motor 16. Advancement of drilling end 14 into the earth is accomplished by forcing drill bit 15 through strata 13 by the weight of drill string 18 and the action of rotating teeth located on the end of drill bit 15.

Downhole drilling motors such as downhole drilling motor 16 are cylindrical so as to be capable of passing through bore hole 11 drilled by drill bit 15. Downhole drilling motors must, therefore, conform to the size restriction imposed by the outside diameter of drill bit 15 on the lower end of drill string 18. The length of downhole motor 16, however, has no such constraints and often ranges up to thirty feet. Downhole drilling motors utilize the effect of drilling mud pressure and the momentum change of drilling mud as it passes through turbine blades to provide torque to turn drill bit 15. Drill bit 15 penetrates earth and rock by a combination of the downward pressure exerted by the weight of drill string 18 and the rotary action imparted to drill bit 15 by downhole drilling motor 16. As the bore hole deepens, additional sections of pipe are added to drill string 18 at drill rig 10.

B. DOWNHOLE THRUST BEARINGS

FIG. 2 illustrates in more detail drilling end 14 of drill string 18 shown in FIG. 1. A casing 17 of downhole drilling motor 16 is shown attached to the last segment of drill string 18. Located within casing 17 of downhole drilling motor 16 are two thrust bearing assemblies, an upper thrust bearing assembly 20 and a lower thrust bearing assembly 21. Downhole drilling motor 16 powers drill bit 15 located at a free end 19 of drilling end 14.

Thrust bearing assemblies 20, 21 allow for the rotation of drill bit 15 relative to casing 17 of downhole drilling motor 16. To maintain the rotation of drill bit 15 when downhole drilling motor 16 is powering drill bit 15, thrust bearing assemblies 20, 21 must be capable of operating under compressive pressure from the weight of drill string 18 and tensile pressure from the force of the pressurized drilling mud passing through downhole drilling motor 16.

Drilling mud is pumped through drill string 18 to downhole motor 16 in a direction shown by arrow A, a direction referred to as "downhole." The high pressure drilling mud exerts a force downhole on drilling motor 16 that tends to push drilling motor 16 toward a bottom 22 of bore hole 11. This force is referred to as "off-bottom" thrust since the pressure is strongest whenever drilling mud is pumped through downhole drilling motor 16 and drill bit 15 is off bottom 22 of bore hole 11. Contact with bottom 22 of bore hole 11, allows a portion of the "off bottom" thrust to be transferred to bottom 22 thereby lessening the "off-bottom" pressure borne by thrust bearing assembly 21.

When drill bit 15 is in contact with bottom 22 of bore hole 11, the weight of drill string 18 exerts a force on drilling end 14 which tends to compress drilling motor 16. This force is referred to as "on-bottom" thrust, as it is experienced only when drill bit 15 is in contact with bottom 22 of borehole 11.

During drilling, on-bottom thrust caused by the weight of drill string 18 is countered by off-bottom thrust caused by the hydraulic pressure of the drilling mud. The interaction of on-bottom and off-bottom thrusts lessens the overall thrust that must be borne by thrust bearing assemblies 20, 21, during actual drilling.

Periodically, during the drilling process, drill bit 15 wears out requiring drill string 18 to be pulled up out of bore hole 11 to gain access to drill bit 15. After replacing drill bit 15, drill string 18 is reassembled as drill bit 15 is lowered back into bore hole 11. During this period of lowering drill string 18 back to the previously achieved depth, drilling mud is pumped under pressure through drill string 18 to turn downhole drilling motor 16 and thereby cause drill bit 15 to rotate and clean bore hole 11 as drill bit 15 descends.

The period during which drill bit 15 is descending into bore hole 11 exposes thrust bearing assemblies 20, 21 to off-bottom thrusts caused by drilling mud pressing downhole drilling motor 16 in a downhole direction. Thrust bearing assemblies 20, 21, do not have the advantage of offsetting on-bottom thrust during this time, and so, must bear the entirety of the off-bottom thrust. Typical on-bottom thrusts may exceed 40,000 pounds and off-bottom thrusts may exceed 30,000 pounds.

To cope with the forces operating on downhole drilling motor 16, the earliest thrust bearings utilized ball bearings travelling in races. Thrust bearing assemblies, such as 20, 21 were positioned at both ends of downhole drilling motor 16 to cope with both on-bottom and off-bottom thrusts. In a first attempt to increase thrust bearing life, ball bearings were replaced with roller bearings to increase the bearing surface carrying the load from on-bottom and off-bottom thrusts.

Roller thrust bearings first used in downhole motors had a useful life of approximately fifty hours. Since drill bits used at the introduction of such bearings had a useful life of only fifteen hours, roller thrust bearings were not a limiting factor in causing down-time. Roller thrust bearings were simply replaced concurrently with drill bit 15 after several intervening drill bit changes. With the introduction of diamond drill bits such as drill bit 15, however, roller thrust bearings have become a limiting factor in the efficient use of drilling equipment. The solution to this disparity in useful life between diamond drill bit 15 and roller thrust bearings has been to develop thrust bearings with longer useful lifetimes. This is accomplished by incorporating synthetic diamonds into the bearing surfaces of thrust bearings 20, 21.

Diamond thrust bearings like thrust bearing assemblies 20, 21 shown in FIG. 2 are comprised of a pair of load-carrying structures in opposed positioned to bear against one another. FIG. 3 illustrates a single such load-carrying structure 24. Load-carrying structure 24 comprises a bearing pad retainer 26 in which are formed a plurality of concentrically disposed bearing pad recesses. In each, a diamond bearing pad 28 is installed by a number of known methods. Diamond bearing pad 28 is cylindrical and comprises a bearing end 32 terminating in a bearing face 34 which actually carries the weight imposed on assembly 24 during use. Opposite bearing end 32, diamond bearing pad 28 has an insertion end 33 which is held in bearing pad retainer 26 by brazing or by interference fit. Diamond bearing pads 28 are typically arranged in a circle inside of annular bearing pad retainer 26. Bearing end 32 projects above a receiving surface 40 of bearing pad recess 26.

As illustrated in FIG. 3A, two load-carrying structures 24 are located such that bearing faces 34 of diamond bearing pads 28 of one bearing pad retainer 26 are in opposing contact and are as close as possible co-planar with corresponding bearing faces 34 of an opposing bearing pad retainer. This orientation is aimed at producing uniform contact between all diamond bearing faces 34 contributing to the longer useful life of diamond thrust bearing assemblies.

C. BEARING PAD MANUFACTURE

The polycrystalline diamond surfaces used to confer excellent wear characteristics and, therefore, longer useful lifetimes on diamond thrust bearings are typically composed of a mixture of individual diamond crystals and particles of pre-cemented carbide.

Diamond bearing pad 28 is often constructed of tungsten carbide in which the synthetic diamond is bonded. The synthetic diamond of bearing face 34 gives diamond thrust bearings a useful life that is coextensive with that of diamond drill bits like drill bit 15. By increasing the useful life of the bearing pad, separate down-time for replacement of these parts is obviated, thereby substantially increasing the productive operational time that drilling equipment is in use in a given period.

Diamond bearing pads are typically manufactured by placing diamond powder, powdered pre-cemented carbide or graphite, and tungsten carbide in a molybdenum canister which is then subjected to concurrent high heat (1,500 degrees Centigrade) and high pressure (1,000,000 p.s.i.) in a multi-anvil cubic press. Polycrystalline bonds are formed between the diamond powder and the pre-cemented carbide particles to form a polycrystalline diamond surface on a tungsten carbide substrate.

As a result of the extremely high heat and temperature used in the manufacture of diamond bearing pads and the molecular structure of polycrystalline diamond, bearing face 34 is forced outward and insertion end 33 is forced outward in the opposite direction, away from bearing face 34 as pressure is exerted on the contents of the canister. The pressure on the outside of the bearing pad results in a slightly curved upper and lower surface in diamond bearing pad 28, such as the slightly curved upper surface of bearing face 34.

After manufacture, bearing pads 28 are inserted into recesses in bearing pad retainer 26. Insertion end 33 is inserted into a bearing pad recess leaving polycrystalline diamond bearing face 34 exposed and extending outward from bearing pad retainer 26. Bearing pads 28 are typically fixed in bearing pad recesses in bearing pad retainer 26 by brazing or by interference fit. Bearing pads 28 and bearing pad retainer 26 make up one load-carrying structure 24.

Two load-carrying structures are assembled in opposed orientation so that diamond bearing faces 34 of one load-carrying structure 24 are in contact with diamond bearing faces 34 of an opposing load-carrying structure 24. Once assembled, the two load-carrying structures form a thrust bearing.

In operation, a first load-carrying structure 24 is typically affixed to a casing of downhole drilling motor 16 while a second load-carrying structure is affixed to a rotating shaft powered by downhole drilling motor 16. Rotation of the shaft by downhole drilling motor 16 causes the second load-carrying structure to be rotated relative to the first load-carrying structure.

As rotation occurs, the bearing faces 34 of one of the load-carrying structures pass across the bearing faces of the opposing load-carrying structure.

1. Point Loading

While on-bottom and off-bottom thrusts are carried by the bearing faces of opposed bearing pads, it is more specific to state that the thrusts are carried at the point of contact between an apex 36 of one curved bearing face and the opposed curved bearing face. When two bearing faces are directly opposed, the apexes of the several pairs of opposed bearing faces are the only actual points of contact between the two opposed bearing pads 28. This condition is referred to as "point loading" since the entire load created by thrust forces is borne by the small points of contact at the apexes between the bearing pads 28 in the opposed load-carrying structures 24.

Since on-bottom and off-bottom thrusts are substantial, heat is created by friction between the opposed points of loading at apexes 36 in the bearing faces as the bearing faces rotate across each other.

Polycrystalline diamond is an excellent conductor of heat, but has a poor capacity to store heat. As a result, heat generated from point loading is quickly dissipated as the heat is conducted across the polycrystalline diamond bearing face from the hot area of point loading occurring at apex 36 to the cooler periphery of the bearing face. Since bearing face 34 has a poor capacity to store the heat generated by point loading, the dissipation of heat traveling across bearing face 34 produces a wide range of temperatures at various points on the bearing face.

This range of temperatures occurs because heat is dissipated at a constant rate in the homogenous bearing face of the bearing pad, yet the amount of heat is constantly being reduced by dissipation. The result is a bearing face with a very hot center, and gradually decreasing temperatures occurring along the path of travel between the center of the bearing face and the periphery of the bearing face.

High amounts of heat lead to degradation of the components of the polycrystalline diamond. Since the high heat generated by point loading would result in an unacceptably short useful life, cooling and lubrication must be provided to the bearing pads to cool the area of point loading on the bearing faces of the opposed bearing pads.

As the arrows $R_1$ and $R_2$ in FIG. 3A indicate, bearing pad retainers 26 rotate relative to each other with an apex of bearing face 34 of bearing pad 28 exposed to alternating point loading accompanied by high heat generation, and periods of no loading as apex 36 alternately rotates past a plurality of spaces 39 between the bearing pads of the opposed load-carrying structure.

In the presently preferred embodiment, apex 36 is centrally located in bearing pad 28. Both of the load-carrying structures 24 are positioned so that contact occurs between apex 36 and space 39 between bearing pads 28. Drilling fluid passing under pressure through the inside of downhole drilling motor 16 is forced out through spaces 39 into borehole 11 and eventually back to surface 12. As drilling fluid passes through spaces 39, it contacts apex 36. The relative disparity in temperature between the cool drilling fluid and the hot bearing face 34 and especially apex 36, causes the exposed portion of the bearing face to be quenched.

As illustrated by the arrows labeled R in FIG. 3B, the opposed load-carrying structures 24 rotate relative to each other. During rotation, apex 36 comes into contact with the bearing face of the opposed bearing pad. In FIG. 3B, centrally located apex 36b has traveled across approximately one-fourth of the diameter of the opposed bearing face of bearing pad 28a. During that travel, heat generated by friction will begin to build up in bearing pads 28a and 28b, but this heat will be most intense at apex 36a and 36b.

As shown in FIG. 3C, continued rotation of opposed bearing pad retainers 26 results in apex 36b and 36a contacting each other. At the point of contact between apex 36b and 36a, one-half of the diameter of bearing pad 28a has been traversed. As rotation continues, apex 36b and 36a continue to generate heat until the drilling fluid flowing through space 39 is once again encountered and quenching occurs. Thus, apex 36b must travel and generate heat across the entire diameter of bearing pad 28 before cooling again occurs.

In addition to the cooling of bearing face 34 in space 39, the circumference of bearing end 32 exposed above a receiving surface 37 of bearing pad retainer 26 are constantly cooled by the flow of drilling fluid passing through spaces 39 between bearing pads 28. This constant cooling flow about the circumference of cylindrical bearing pads 28 augments the periodic cooling of bearing faces 34 and causes the perimeter of bearing pad 28 to be cooler than the more central regions nearer to apex 36. This temperature differential causes heat to dissipate from apex 36 toward the periphery of bearing pad 28.

2. Lubrication

In addition to cooling bearing faces 34 of bearing pads 28, drilling fluid also provides some lubrication to bearing face 34 as apex 36 of opposed convex bearing faces contact each other. This lubricant is spread on apex 36 during the exposure thereof to drilling fluid flowing through spaces 39 when apex 36 is in the position illustrated in FIG. 3A. The lubricant is then squeezed out of bearing faces 34 as apex 36a approaches apex 36b until bearing faces 34 reach a relationship like that illustrated in FIG. 3C. After cooling and lubricating bearing faces 34, drilling fluid passes out of downhole drilling motor 16 and into bore hole 11 where the drilling fluid carries debris and heat from bearing pads 28 to surface of the earth 12.

As bearing face 34 undergoes alternating point loading from contact with an opposing bearing face, and quenching from exposure to drilling fluid, temperatures on bearing face 34 vary dramatically. Areas of bearing face 34 near apex 36 experience point loading and, therefore, undergo the most radical temperature swings. Those areas near the periphery of bearing face 34 experience relatively minor changes in temperature since most of the heat generated at apex 36 of bearing face 34 has been dissipated prior to reaching the periphery of bearing face 34.

In addition, because the peripheral areas of bearing face 34 are constantly cooled by exposure to the flow of drilling fluid through spaces 39, any heat that reaches the periphery is quickly quenched. This divergence in temperature across bearing face 34 causes thermal degradation to occur at the apex of bearing face 34 before areas near the periphery of bearing face 34 experience thermal degradation.

3. Lapping

In an effort to overcome the premature thermal degradation caused by point loading, techniques have been developed to lap or flatten apex 36 of bearing face 34 caused in manufacture of diamond bearing pad 28. As shown in FIG. 4, a lapping device 41 grinds apex 36 to create a larger area of contact between opposed bearing faces. This larger contact area reduces the heat caused by friction which, thereby increases the thermal stability of bearing face 34.

Lapping device 41 has a planar lapping surface 42 which is used to grind flat apex 36 of curved bearing face 34. Lapping device 41 rests on bearing face 34. Since bearing face 34 has a centrally-located apex 36, however, it is difficult for lapping device 41 to impart a planar surface to bearing face 34. Lines in phantom illustrate how lapping device 41 rests on only one point, namely apex 36, shown at Arrow A. With only one point of support, lapping device 41 has a tendency to assume a non-planar attitude wherein one side of lapping surface 42 rests on the periphery of bearing face 34 and the other side rests on apex 36.

As lapping surface 42 is rotated, it alternates between the attitudes depicted by positions "B" and a position atop apex 36. In positions B, lapping device 41 is not imparting a planar surface to bearing face 34 but is instead creating a slightly curved surface albeit less than the original curvature of bearing face 34. While this process does slightly increase the effective bearing contact area between opposed bearing faces through removal of a quantity of material 44 on bearing face 34 as shown by hatching, the result is still a slightly curved surface.

In use, this lapped bearing face presents more surface area for contact with an opposed bearing face than unlapped bearing faces, but the surface is not planar and, therefore, does not significantly increase the effective bearing contact surface.

4. Channels

In an effort to further reduce surface temperatures of bearing face 34 leading to thermal degradation, some manufacturers have formed channels through bearing face 34 to provide routes for drilling fluid during the time when bearing face 34 is occluded by the bearing face of the opposed bearing pad. This improvement provides a method of cooling the bearing faces during the period of greatest surface heat generation, namely during occlusion of the bearing face by the opposed bearing face.

To maintain a flow of drilling fluid through the channels, a supply of drilling fluid is pumped at high pressure through the channels. While this cooling system overcomes some of the prior problems with surface temperature, the flow of high pressure drilling fluid constantly erodes the bearing pad retainer and the exposed portions of bearing pads 28. Erosion of bearing pad retainer 26 and bearing pads 28 results in bearing pads becoming weakened and breaking off or falling out of retainer 26 with a resultant loss in total effective surface area and an increase in temperatures in the remaining bearing pads. This increase in temperature further exacerbates thermal degradation leading to premature bearing failure.

In addition, some bearing pads with channels must be positioned during manufacture so that the channels are aligned with the flow of drilling fluid. Misaligned channels cause some bearing pads to get hotter than others resulting in premature bearing failure of the misaligned pads which, in turn, places a greater burden on the remaining pads.

OBJECTS AND BRIEF SUMMARY OF THE INVENTION

It is, therefore, one object of the present invention to reduce the cost of drilling oil wells for exploration and production, thereby reducing the cost of petroleum products to the consumer.

Another object of the present invention is to provide an improved thrust bearing with load-carrying structures that lengthen the operating time of leased equipment during the term of the lease.

A further object of the present invention is to reduce the time needed for maintenance and repair of load-carrying structures by providing an improved thrust bearing with a useful lifetime equal to or exceeding that of a diamond drill bit thereby allowing both parts to be replaced simultaneously.

A still further object of the present invention is to provide a load-carrying structure employing bearing pads that reduce the effects of point loading leading to thermal degradation.

Another object of the present invention is to provide a load-carrying structure that has bearing pads with a heat storage capacity sufficient to absorb the pulses of heat caused by alternate point loading and quenching before that heat can travel across the bearing face thereby increasing the surface temperature of the polycrystalline diamond bearing face.

Yet another object of the present invention is to provide a load-carrying structure with bearing pads that dissipate heat near the point where the heat was generated so that heat will not travel across the bearing face to the pad periphery.

A further object of the present invention is to provide a load-carrying structure with bearing pads having bearing faces that are lubricated even when occluded by a bearing face of an opposed bearing pad.

A still further object of the present invention is to provide a load-carrying structure which does not require a high rate of fluid flow to cool the bearing pads thereof.

Another object of the present invention is to provide a load-carrying structure that has bearing pads that do not rely on orientation within the bearing pad retainer to achieve adequate cooling.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a load-carrying structure is provided. The load-carrying structure employs an annular bearing pad retainer having a plurality of bearing pad recesses formed in a receiving surface of the bearing pad retainer. A plurality of bearing pads are inserted into the corresponding bearing pad recesses. The bearing pads are fixed into the bearing pad recesses by brazing or by interference fitting.

Each bearing pad terminates in a bearing face which has a periphery encircling the bearing face and at least one indentation having a perimeter formed within the bearing face. The perimeter of the indentation does not contact the periphery of the bearing pad. Other embodiments presently preferred for some applications utilize a plurality of indentations formed within the bearing face. These indentations may be circular or may take the form of grooves, spirals, ovals or other advantageous configurations.

The presently preferred embodiment utilizes one centrally-located circular indentation having an annular flattened area encircling the indentation forming an effective bearing contact area between an outer border of the flattened area and the perimeter of the indentation.

Other ways to broadly conceptualize the invention are discussed in the following paragraphs. For example, the invention provides a reservoir means formed in a portion of the bearing face for retaining a material when that portion of the bearing face is occluded by a bearing face of an opposing bearing pad. The reservoir means provides cooling to the bearing face of the opposed bearing pad as the opposed bearing face is rotated across the reservoir means.

The invention also provides for a means for increasing the effectiveness of a lapping process used to flatten and increase the effective bearing contact area of the bearing face. By providing a co-planar series of non-collinear points of contact, the invention provides a planar surface which supports the planar lapping surface of the lapping device. When supported in this planar orientation, the lapping device can remove a curvature in the bearing face created in manufacturing thereby imparting a planar surface to the bearing face.

A further benefit derived from the invention is a lubricating means for providing lubrication to the opposed bearing face. Lubrication captured in an indentation is applied to an opposed bearing face when the bearing face with the indentation is occluded by contact with that opposed bearing face.

While the invention serves to control heat in several ways, one method is a temperature modulation means comprising an indentation and a material in the indentation. When filled with a material of high heat storage capacity, the material in the indentation serves to dissipate heat by storing the heat thereby reducing the length of travel of heat. In the present invention, heat generated near the center of the bearing face travels merely into the material in the indentation instead of following a path of travel from the center of the bearing face to the periphery of the bearing face, heating the entire bearing face as it travels.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

Figure 5:
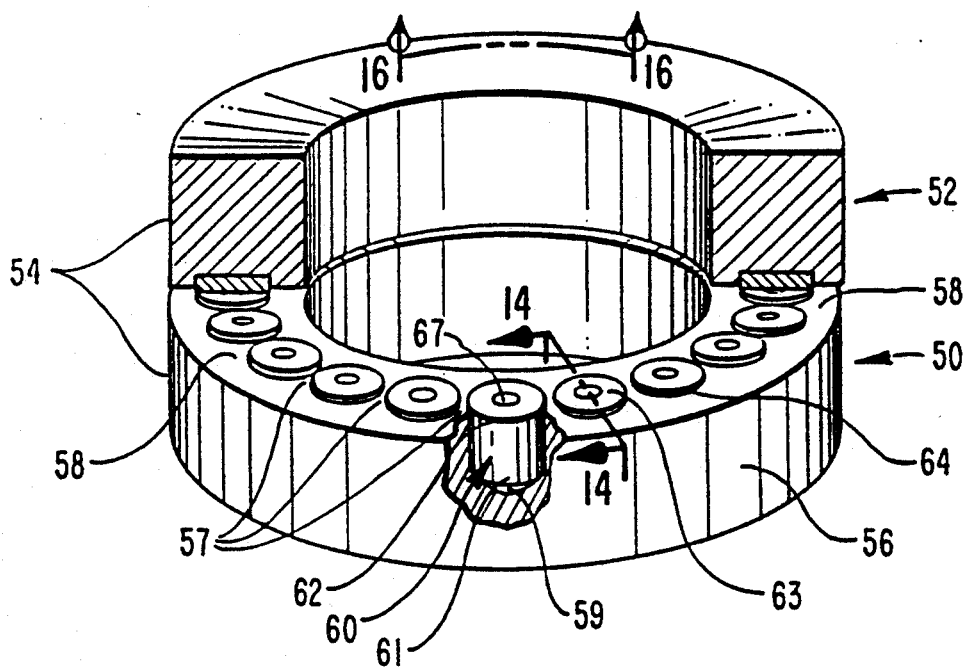
FIG. 5 is a cutaway view of a thrust bearing showing the placement of bearing pads in a load-carrying structure.

To best understand the interrelationship of the bearing pads and bearing pad retainers that comprise a load-carrying structure, reference should first be made to FIG. 5.

Figure 1:
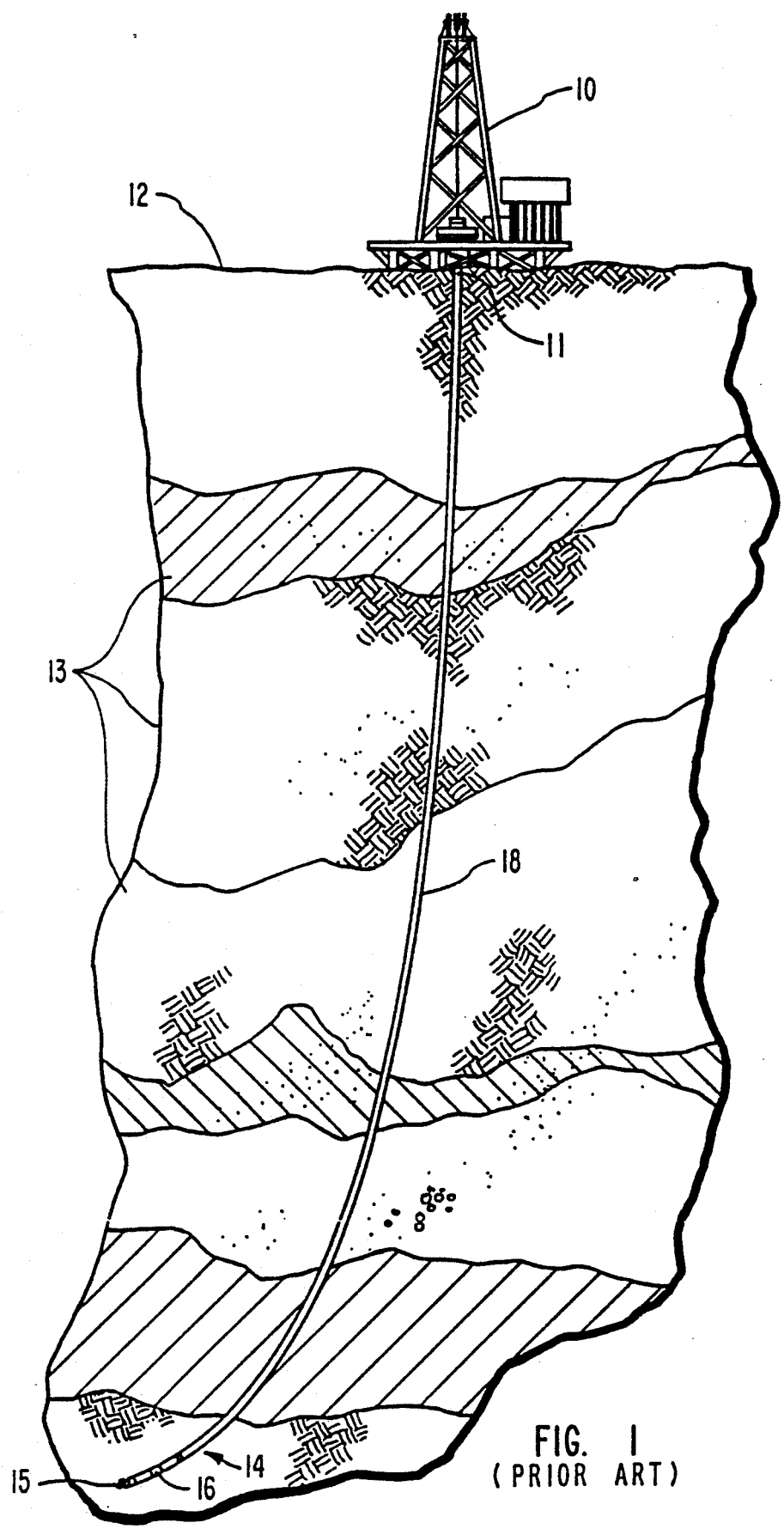
FIG. 1 is a schematic view of the environment in which the inventive load-carrying structure is used, showing a drilling rig, a drill string, a hydraulic downhole drilling motor, and a drill bit at the drilling end of the drill string.
Figure 2:
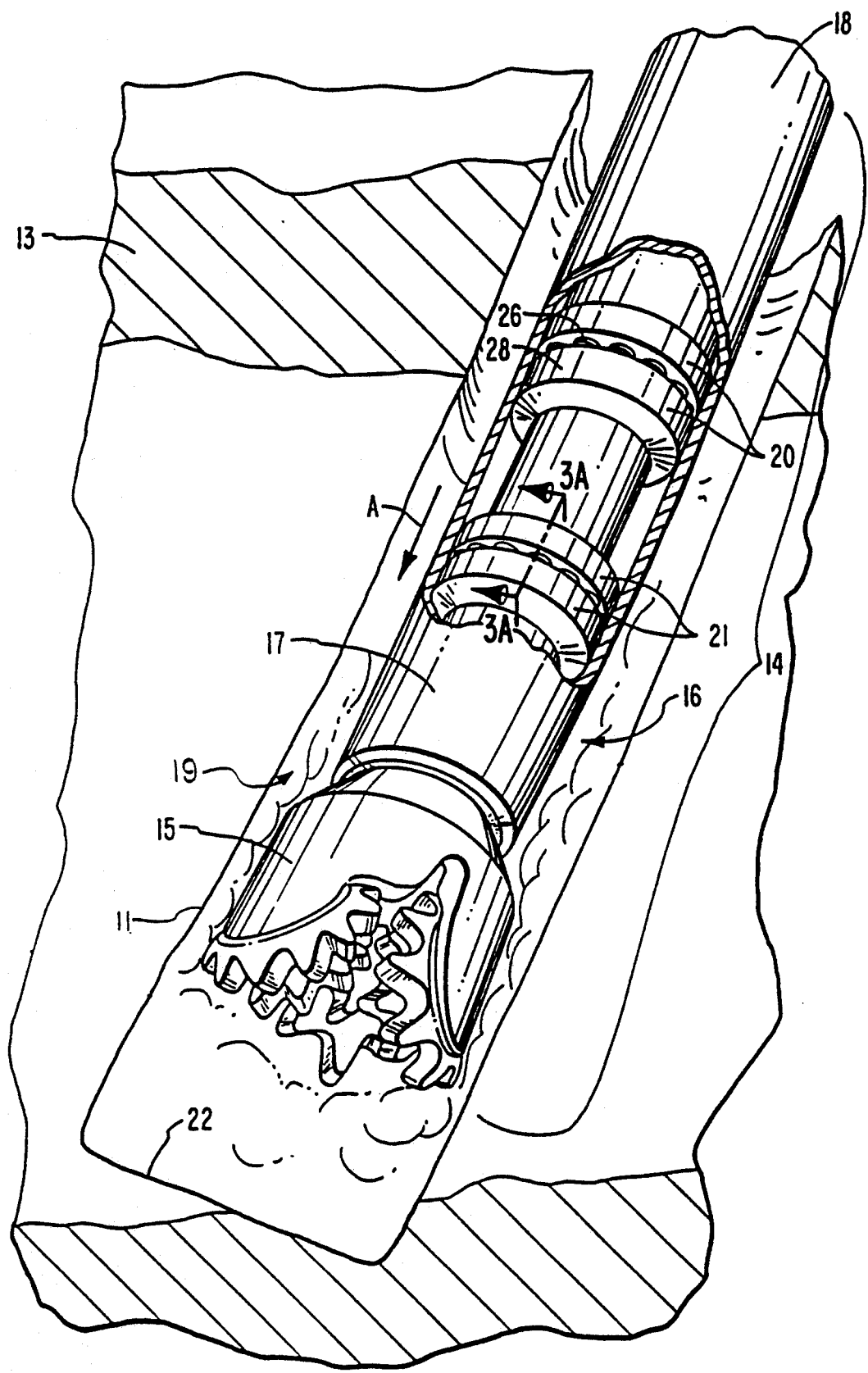
FIG. 2 is an enlarged schematic view of the drilling end of the drill string of FIG. 1.
Figure 3:
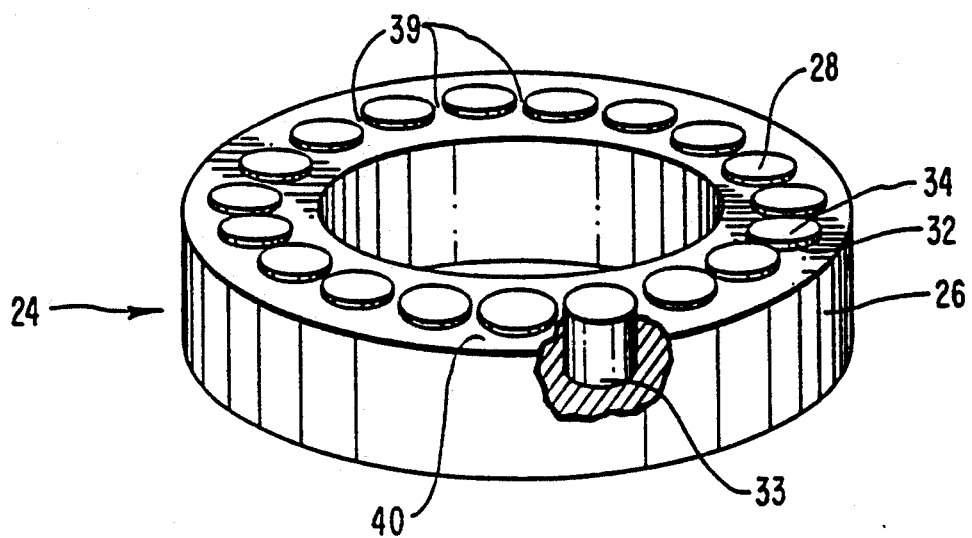
FIG. 3 is an enlarged perspective view of a load-carrying structure making up half of the thrust bearing assembly shown in FIG. 2.
Figure 3A:
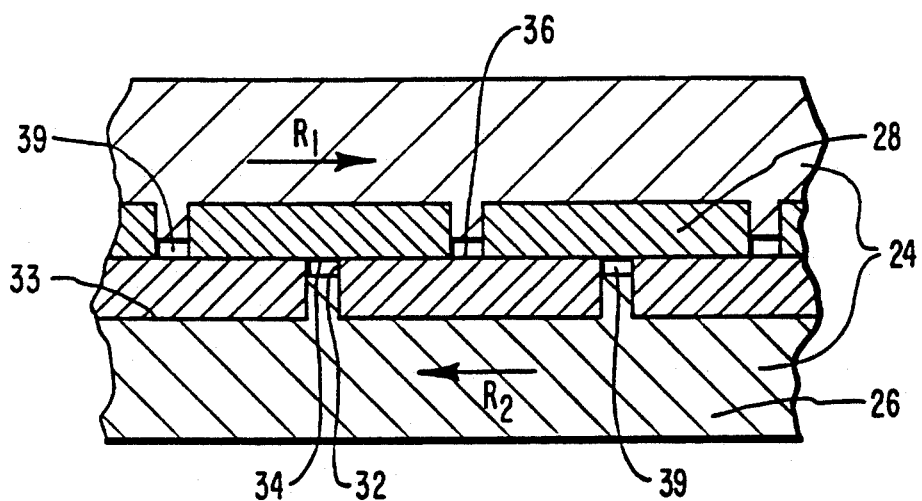
FIGS. 3A-3C are a series of cross-sectional views depicting the rotation of the thrust bearing assembly shown in FIG. 2.
Figure 3B:
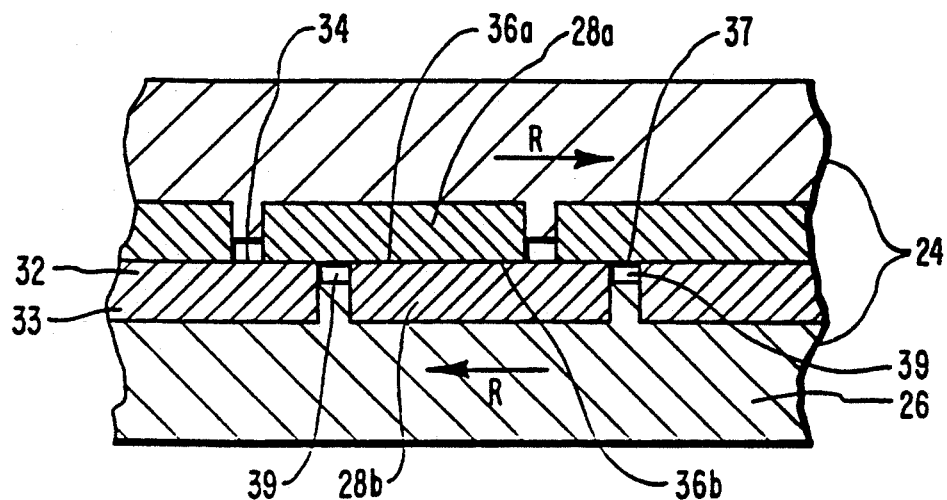
Figure 3C:
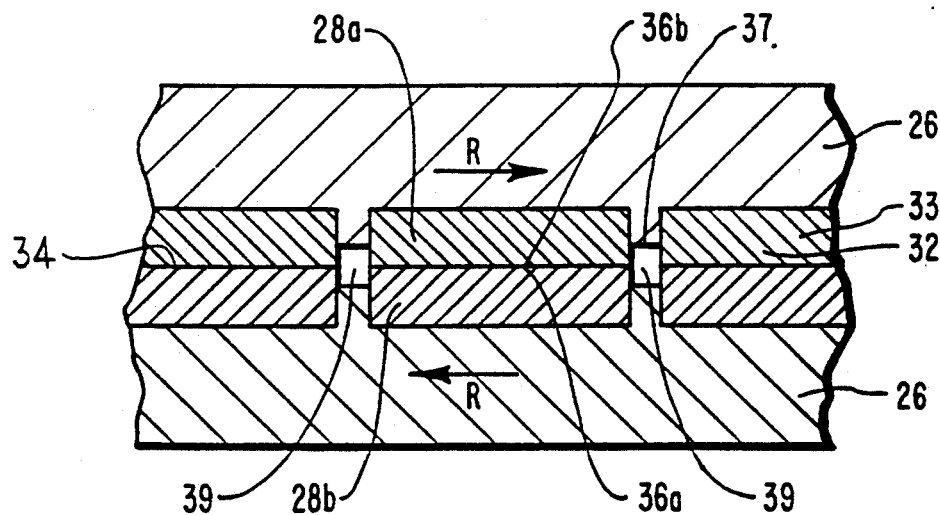
Figure 4:
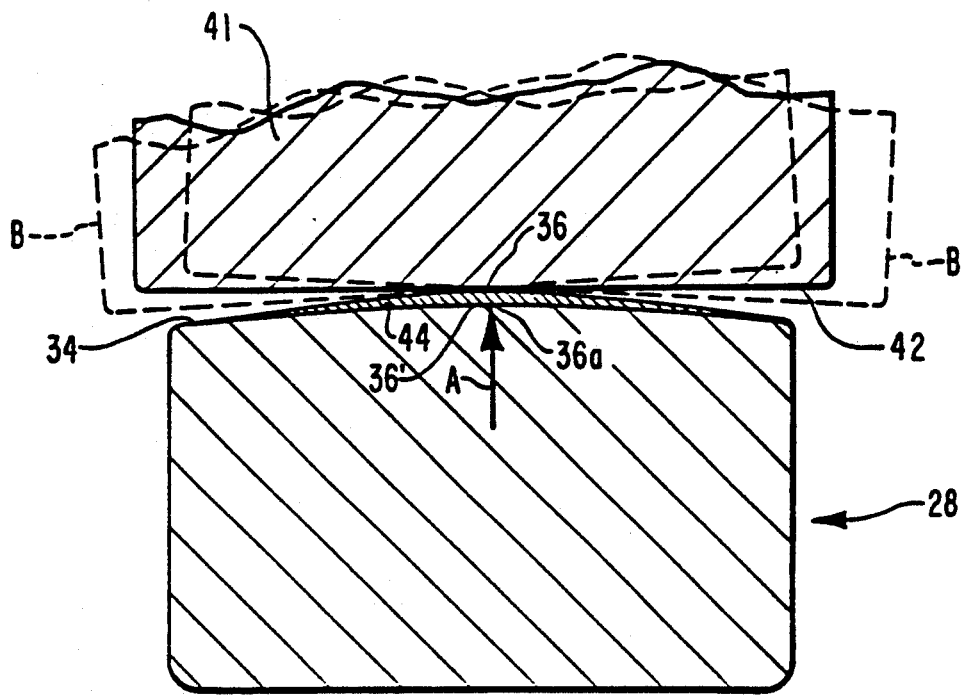
FIG. 4 is an enlarged cross-sectional view of a diamond bearing pad from the load-carrying structure shown in FIG. 3 undergoing lapping.

FIG. 5 is a cut-away cross-section of a thrust bearing assembly 54 functioning in the same location as thrust bearing assembly 21, shown in FIG. 2, but incorporating teachings of the present invention. A thrust bearing assembly is comprised of two opposing load-carrying structures, a first load-carrying structure 50 and a second load-carrying structure 52.

Each load-carrying structure is comprised of two bearing pad retainers 56 which have a receiving surface 58 in which spaces 57 separate a plurality of bearing pad recesses 59. Into each bearing pad recess 59 a bearing pad 60 is inserted.

Bearing pads 60 have an insertion end 61 which is brazed into bearing pad recess 59. The opposite end or bearing end 62 terminates in a bearing face 63.

Figure 6:
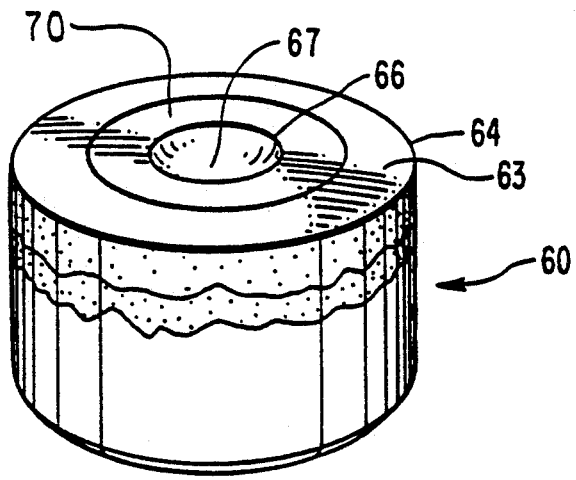
FIG. 6 is a perspective view of a bearing pad as shown in FIG. 5, having a centrally located indentation.

Referring now to FIG. 6, located within a periphery 64 of bearing face 63 is an indentation 67 which has a perimeter 66. An annular flattened area surrounding indentation 67 forms an effective bearing contact surface 70.

As first load-carrying structure 50 rotates relative to second load-carrying structure 52 in thrust bearing assembly 54, the thrusts are borne by the effective bearing contact surfaces 70. As indentation 67 is formed in bearing face 63, the apex is removed. Indentation 67 may be formed by a number of processes. One process introduces an inert powder into the canister containing the diamond powder and pre-cemented carbide at a location corresponding to the center of bearing face 63. After pressing, the inert powder is blown out.

Contact between opposing bearing faces with apexes removed takes place between the area at the perimeter of the indentation and the opposing bearing face. This area of contact is larger than the area of contact at the former apex of the bearing face. As a result of this increased area, less heat is produced in bearing faces with indentations than in bearing faces with apexes.

According to one aspect of the present invention, a diamond bearing pad, such as bearing pad 60, is provided with a reservoir means formed in a portion of bearing face 63 for retaining material when that portion of the bearing face is occluded by the bearing face of the opposed bearing pad. By way of example and not limitation, the reservoir means of the embodiment shown in FIG. 6 comprises an indentation 67 centrally located within a periphery 64 of bearing face 63.

Although all of bearing faces 63 in the embodiment shown in FIG. 5 have indentations, it will be appreciated that embodiments of thrust bearing assembly 54 may utilize indentations in less than all of the bearing pads in a load-carrying structure and still fall within the teachings of the present invention.

Referring still to FIG. 5, one factor that causes a reduced useful life of polycrystalline diamond bearing faces is heat. One form of destructive heat is caused by the thermal variations as the bearing faces are alternately subjected to heat and quenching. Heat from friction is generated as the bearing face passes across opposed bearing faces. As the bearing face passes across spaces 57, drilling fluid flowing through the spaces quenches the bearing face.

These thermal variations are exacerbated by the twin properties of polycrystalline diamond, that of superb conduction of heat and poor capacity to store heat. If not controlled, the thermal variations or pulses will rapidly travel from near the center of the bearing face to the periphery. As this heat travels, it dissipates into bearing pad 60. If enough heat is dissipated, the useful life of the polycrystalline diamond will be shortened.

Figure 7:
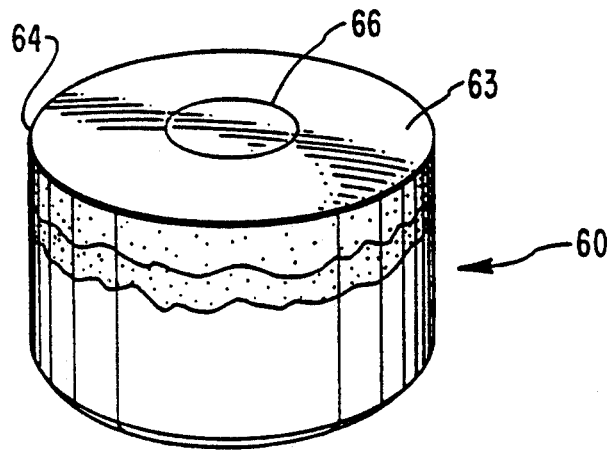
FIG. 7 is a perspective view of a bearing pad like that shown in FIG. 5, having an indentation filled with a material.

Referring now to FIG. 7, and according to another aspect of the present invention, a diamond bearing pad such as diamond bearing pad 60 is provided with a temperature modulation means formed in bearing face 63 for storing heat produced at the perimeter 66 of indentation 67. By way of example and not limitation, the temperature modulation means illustrated in FIG. 7 comprises indentation 67 and a material held therein.

By providing a material within indentation 67 that has a higher heat storage capacity than polycrystalline diamond, a degree of thermal stability is imparted to bearing face 63. Heat generated at areas of loading can be stored in the material in indentation 67 before being released by quenching during contact with the stream of drilling fluid at space 57. By storing this heat instead of allowing it to travel across bearing face 63 to periphery 64, thermal stability is imparted to the bearing pad and the polycrystalline diamond bearing face thereof is maintained in a thermal environment which prolongs the useful life of the polycrystalline diamond.

The material within indentation 67 with a heat storage capacity higher than polycrystalline diamond is typically drilling fluid, however this material need not be a liquid. By way of example and not limitation, the embodiment illustrated in FIG. 7 has the indentation filled with tungsten carbide. Heat generated by contact with the opposed bearing face will be stored in the tungsten carbide in the indentation until the heat is released by passing through the stream of drilling fluid flowing through the spaces between the bearing pads.

While heat storage is especially important at the center of bearing face 63 to prevent heat from dissipating across the entire bearing face as it travels in a path from the center to the perimeter of bearing face 63, the storage function of indentation 67 when filled with a material is also important to the preservation of polycrystalline diamond at locations remote from perimeter 66 of bearing face 63.

As heat is generated in bearing pads not utilizing the teachings of the present invention, the heat must travel in a conductive path from an apex of bearing face 63 to periphery 64 before the heat is fully dissipated.

Figure 8:
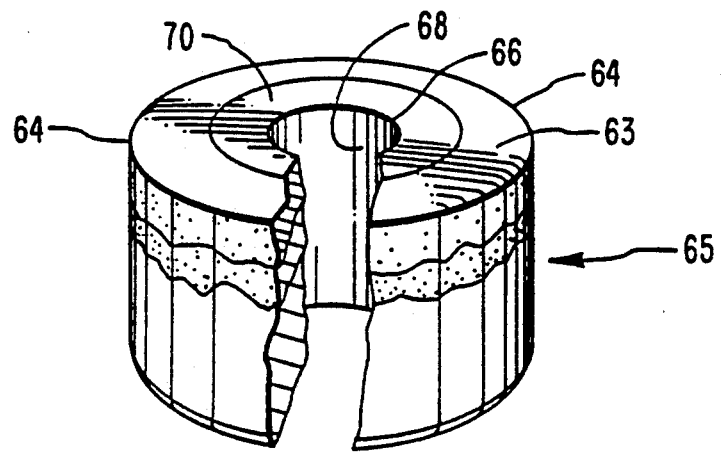
FIG. 8 is a perspective view of a bearing pad like that shown in FIG. 5 having an indentation that extends through the bearing pad.

In FIG. 8, an embodiment of the present invention is illustrated in which the conductive path that heat must travel before being dissipated is shorter than the path traveled by heat in bearing pads not utilizing the teachings of the present invention. According to one aspect of the present invention, a diamond bearing pad such as diamond bearing pad 65 is provided with a heat dissipation enhancement means in bearing face 63 for reducing the length of a path of travel of heat produced at bearing face 63 when the heat is conducted to cooler areas of bearing face 63. In the embodiment illustrated in FIG. 8, by way of example and not limitation, the heat dissipation enhancement means comprises a heat tunnel 68.

Heat tunnel 68 is formed centrally in bearing pad 65 and extends from bearing face 63 completely through bearing pad 65. Heat tunnel 68 greatly increases the surface area from which heat can dissipate. Heat tunnel 68 may be cooled by contact with drilling fluid, or by communication with air or other cooling media. As heat is generated near heat tunnel 68, the heat will have a short conductive path to the cooler areas presented by heat tunnel 68 instead of traveling to periphery 64 before becoming dissipated. This shortened conductive path relieves much of bearing face 63 from being exposed to the passage of this heat.

Figure 9:
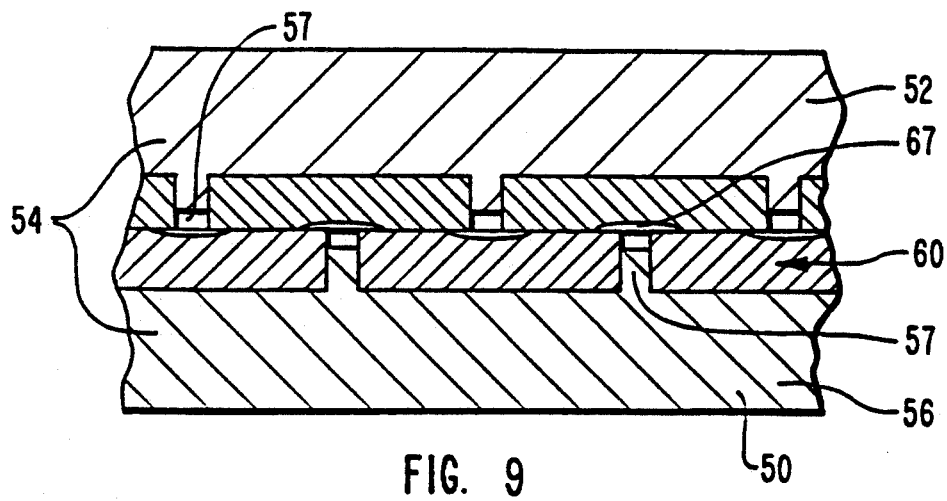
FIG. 9 is a cross-sectional view of the thrust bearing shown in FIG. 5 illustrating an indentation in contact with an opposing apex.

When opposed load-carrying structures 50, 52 are aligned as in FIG. 9, drilling fluid passing through spaces 57 is forced over indentation 67. While in this orientation, indentation 67 is filled with a stream of drilling fluid. As load-carrying structure 52 rotates relative to load-carrying structure 50, indentation 67 becomes occluded. As used in this specification, the term occluded describes the condition of being partially or totally occluded.

In the past, cooling has been accomplished through the use of high pressure drilling fluid being pumped through channels. The present invention, however, avoids the erosive effects of high pressure fluid by providing a mechanism that utilizes drilling fluid at a low, less erosive flow. Much of the effectiveness of indentation 67 in performing its many functions depends on the ability of indentation 67 to retain drilling fluid during the counterrotation of load-carrying structures 50, 52. The flow required for bearing pads utilizing the teachings of the present invention need only be high enough to fill an indentation, such as indentation 67a in FIG. 17A as the indentation passes across space 57.

Figure 10:
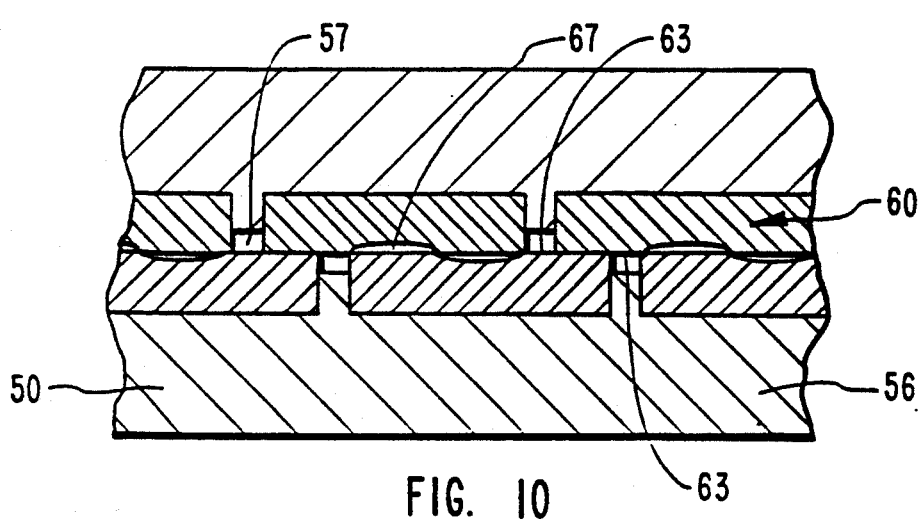
FIG. 10 is a cross-sectional view of the thrust bearing shown in FIG. 5 illustrating an indentation in a fully occluded condition.

FIG. 10 illustrates indentation 67 in an occluded position. Indentation 67 is no longer in communication with the stream of drilling fluid, but is functioning as a reservoir of drilling fluid that is being presented to bearing face 63 of opposed load-carrying structure 50. Serving in this capacity, indentation 67 absorbs heat from bearing face 63 of the opposed load-carrying structure as bearing face 63 passes across indentation 67.

Figure 11:
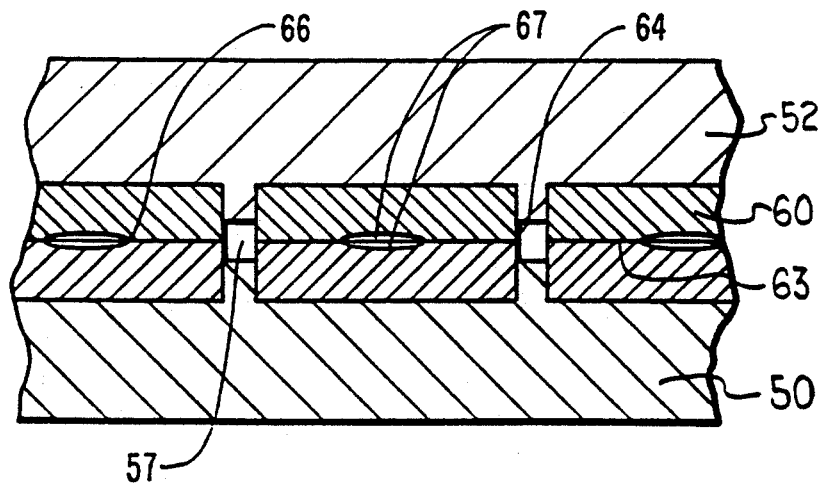
FIG. 11 is a cross-sectional view of the thrust bearing shown in FIG. 5 illustrating an indentation fully covered by an indentation in a bearing face of an opposed bearing pad.

FIG. 11 illustrates an orientation between load-carrying structures 50, 52 in which indentation 67 is not occluded by bearing face 63 but by an opposed indentation. In this condition, indentation 67 and the fluid trapped therein provides cooling in a reservoir function only to bearing pad 60 surrounding indentation 67, and not to bearing face 63. As rotation continues, however, immediate quenching will be provided by the reintroduction of indentation 67 to opposed bearing face 63.

As periphery 64 of bearing face 63 comes into contact with an opposed bearing face, heat will begin to build up due to friction. Since loading occurs primarily in the central areas of bearing face 63, the hottest areas pass over indentation 67 as load-carrying structures 50, 52 rotate relative to each other. As periphery 64 travels across the opposed bearing face, periphery 64 will encounter a perimeter 66 of indentation 67.

Upon encountering perimeter 66 of indentation 67 and while passing over indentation 67, bearing face 63 will be quenched. The period during which no cooling is provided to bearing face 63 has been greatly reduced by use of indentation 67. Periphery 64 need now only travel the distance between the periphery of the opposed bearing face and perimeter 66 before being cooled. This distance is less than one-half of the distance required without indentation 67.

According to one aspect of the present invention, a diamond bearing pad, such as diamond bearing pad 60 is provided with lubricating means in the bearing face thereof for providing lubrication to the bearing face of an opposing bearing pad when bearing face 63 is occluded by contact with the opposed bearing face of that opposing bearing pad.

By way of example and not limitation, the lubricating means of the embodiment shown in FIG. 11 comprises indentation 67 and a quantity of a lubricating medium held therein. An example of one lubricating medium used in the oil exploration field is drilling fluid. As drilling fluid is pumped through load-carrying structures 50, 52, the drilling fluid is forced out through spaces 57. As drilling fluid passes over bearing face 63, indentation 67 is filled as it rotates across space 57. As load-carrying structure 50 continues to rotate, a quantity of drilling fluid is trapped in indentation 67. The upper surface of this quantity of fluid is then exposed to the bearing face of an opposed bearing pad. As discussed previously, during exposure of the drilling fluid in indentation 67 to the bearing face of the opposed bearing pad heat is absorbed. The absorption of heat causes the quantity of lubricating fluid to expand within indentation 67. This expansion of fluid tends to push load-carrying structures 50, 52 apart, thereby decreasing the effective friction between the two opposed load-carrying structures.

In addition to the lubricating effects of expanding drilling fluid, indentation 67 also serves a lubricating function by applying a lubricating film to the bearing face of the opposed bearing pad as the bearing face passes across indentation 67. Because of the extreme loads transferred between load-carrying structures 50, 52, lubricating fluid applied during exposure to the stream of drilling fluid at space 57 is squeezed out between the opposed bearing faces 63 of opposed bearing pads 60. Without this lubricating film, friction and heat increase rapidly.

As bearing face 63 passes across indentation 67, a film of lubricating fluid is applied to the central portion of bearing face 63, where the most heat is generated. This additional coating of lubricating fluid at the midpoint of bearing face 63 significantly reduces the distance that the opposed bearing face must travel in an unlubricated condition. This additional lubrication increases the useful life of bearing pad 60 by lowering the friction and, therefore, temperatures at bearing face 63.

Figure 12:
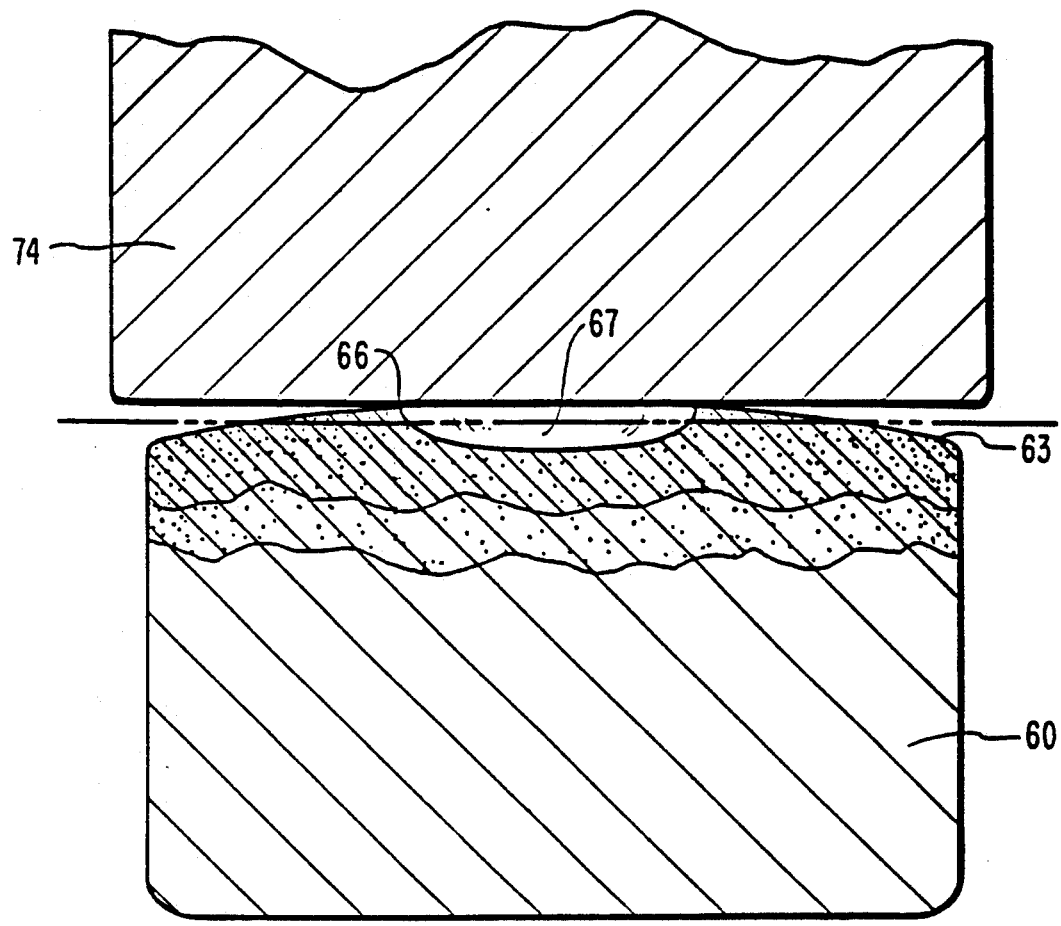
FIG. 12 is a cross-sectional view of a bearing pad undergoing the initial stages of lapping.

An additional advantage of the centrally located indentation in bearing face 63 illustrated in FIG. 12 relates to the increase caused thereby in the effective bearing contact surface.

The result of creating a centrally located recess is that the apex of the bearing face is removed in the process. Removal of the apex results in perimeter 66 becoming the area of contact between opposed bearing pads. The perimeter 66 of indentation 67 has a circular surface area that is much larger than the single point of contact provided by apex 36. This alone greatly increases the effective bearing contact surface between the opposed bearing pads over the effective bearing contact surface provided by the apex.

Another advantage relates to the effectiveness of lapping of the forward pad. According to another aspect of the present invention, a diamond bearing pad such as bearing pad 60 is provided with a stabilizing means for increasing the effectiveness of a lapping process used to flatten the effective bearing contact area of the bearing face. By way of example and not limitation, the stabilizing means in FIG. 12 comprises perimeter 66 encircling indentation 67 in bearing face 63.

To increase the effective bearing contact surface to an area larger than that provided by perimeter 66, FIG. 12 illustrates lapping device 74 employed to produce a flattened annular area surrounding perimeter 66 of indentation 67. During lapping of a bearing face employing indentation 67, the added support of the many points of contact at perimeter 66 assures that lapping device 74 does not "fall off" of curved bearing face 63.

Instead, the effect of employment of indentation 67 is to present a collection of co-planar non-collinear points in the from of perimeter 66 that defines a planar surface on which lapping device 74 may bear, thereby aiding in the achievement of a substantially planar flattened area encircling indentation 67. This substantially planar flattened area greatly increases the effective bearing contact area of bearing face 63 and thereby further reduces temperatures in bearing face 63.

Figure 13:
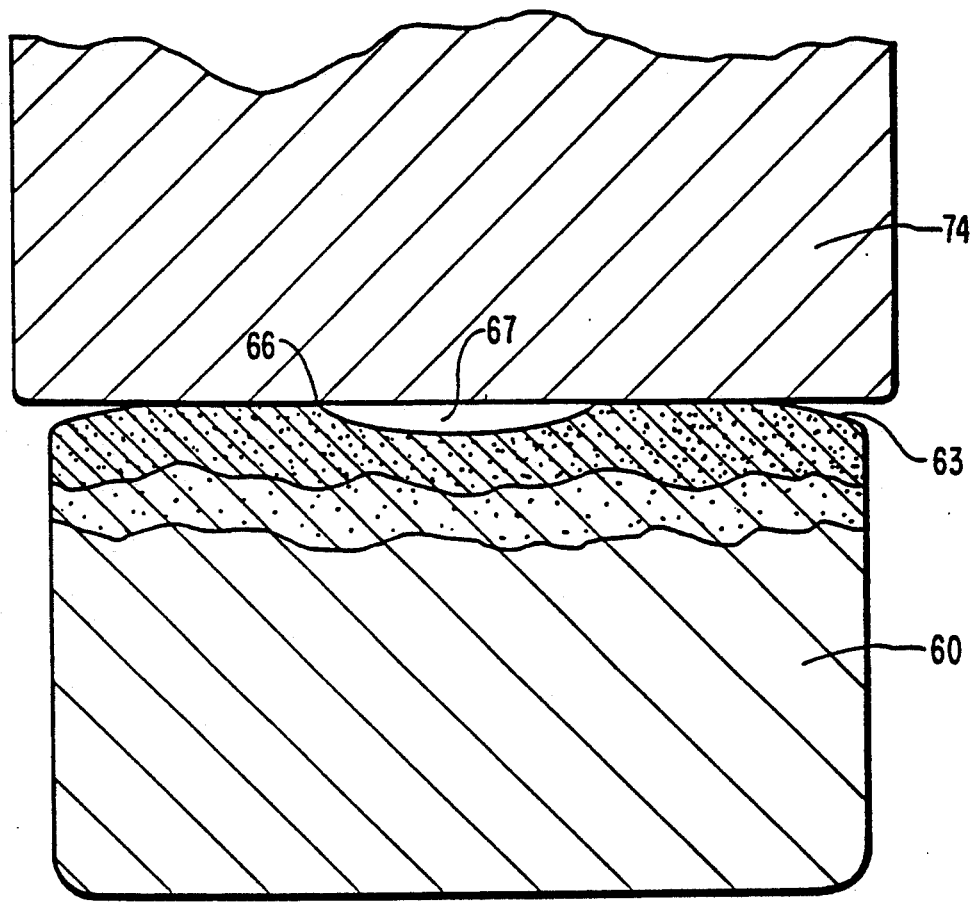
FIG. 13 is a cross-sectional view of a bearing pad as shown in FIG. 12 during later stages of lapping.

To achieve a flattened area encircling indentation 67, lapping device 74 is applied to perimeter 66 until a quantity of material has been removed from bearing face 63. As can be seen by comparing the bearing faces 63 of FIGS. 12 and 13, the original circular area of contact in FIG. 12 has been increased to a substantially flattened annular region in FIG. 13 with a greatly increased effective bearing contact surface.

Figure 14:
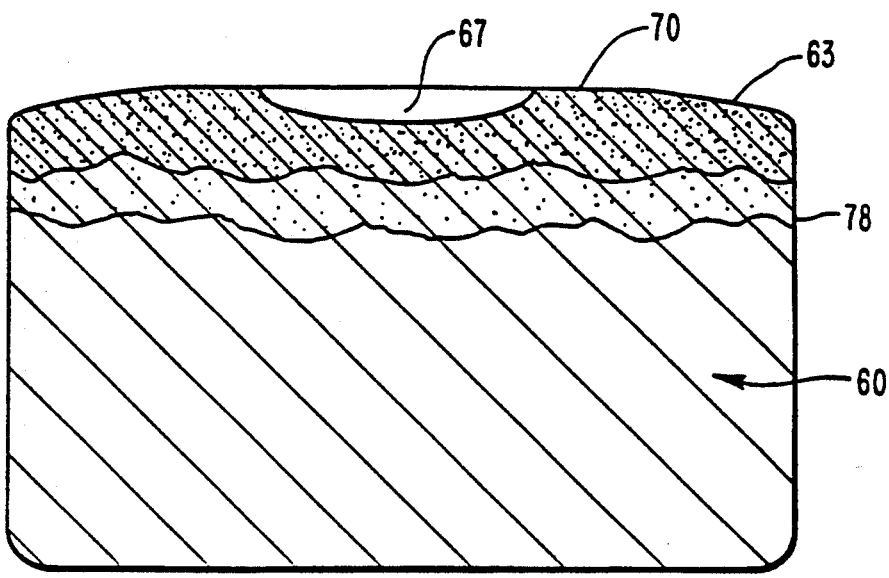
FIG. 14 is a cross-sectional view taken along line 14—14 in FIG. 5 showing a lapped bearing pad like that undergoing lapping in FIG. 13.
Figure 15:
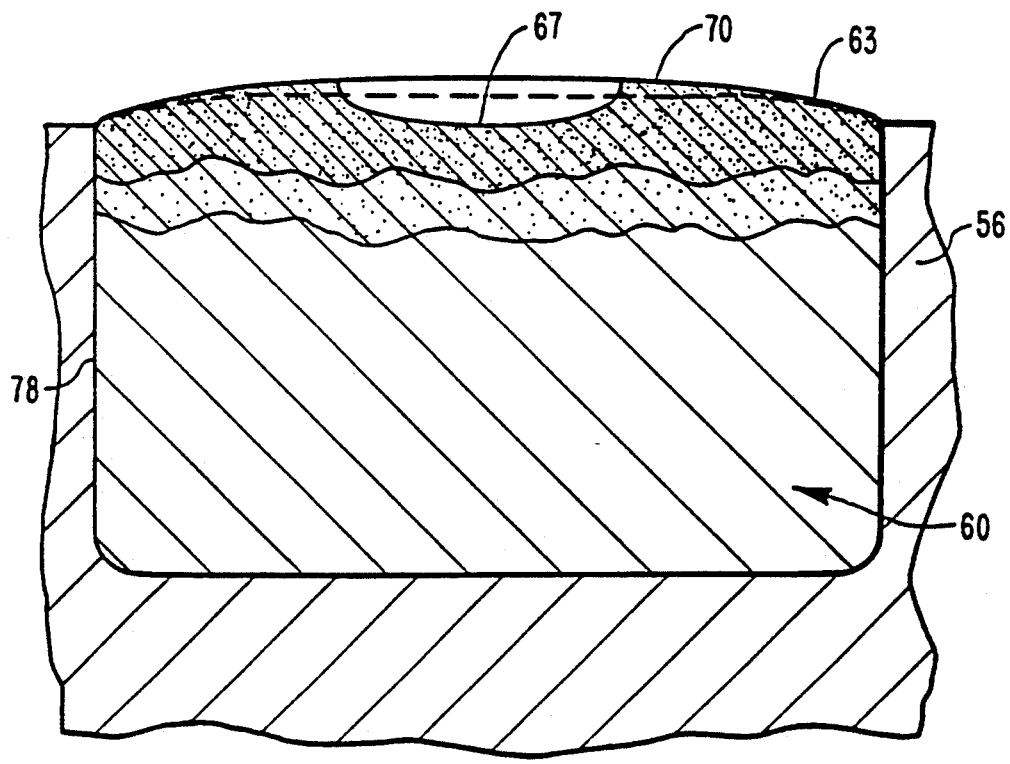
FIG. 15 is a cross-sectional view showing a bearing pad like that illustrated in FIG. 14, inserted into a load-carrying structure.

After lapping, bearing pads 60 appear as illustrated in FIG. 14 with the walls 78 of bearing pad 60 pressed into bearing pad retainer 56 illustrated in FIG. 15. To retain bearing pads 60 in bearing pad retainer 56, bearing pad recess 59 is formed which is smaller in diameter than the outside diameter of bearing pad 60. Upon pressing bearing pad 60 into bearing pad recess 59, an interference fit is established between walls 78 and recess 59 which holds bearing pad 60.

Figure 16:
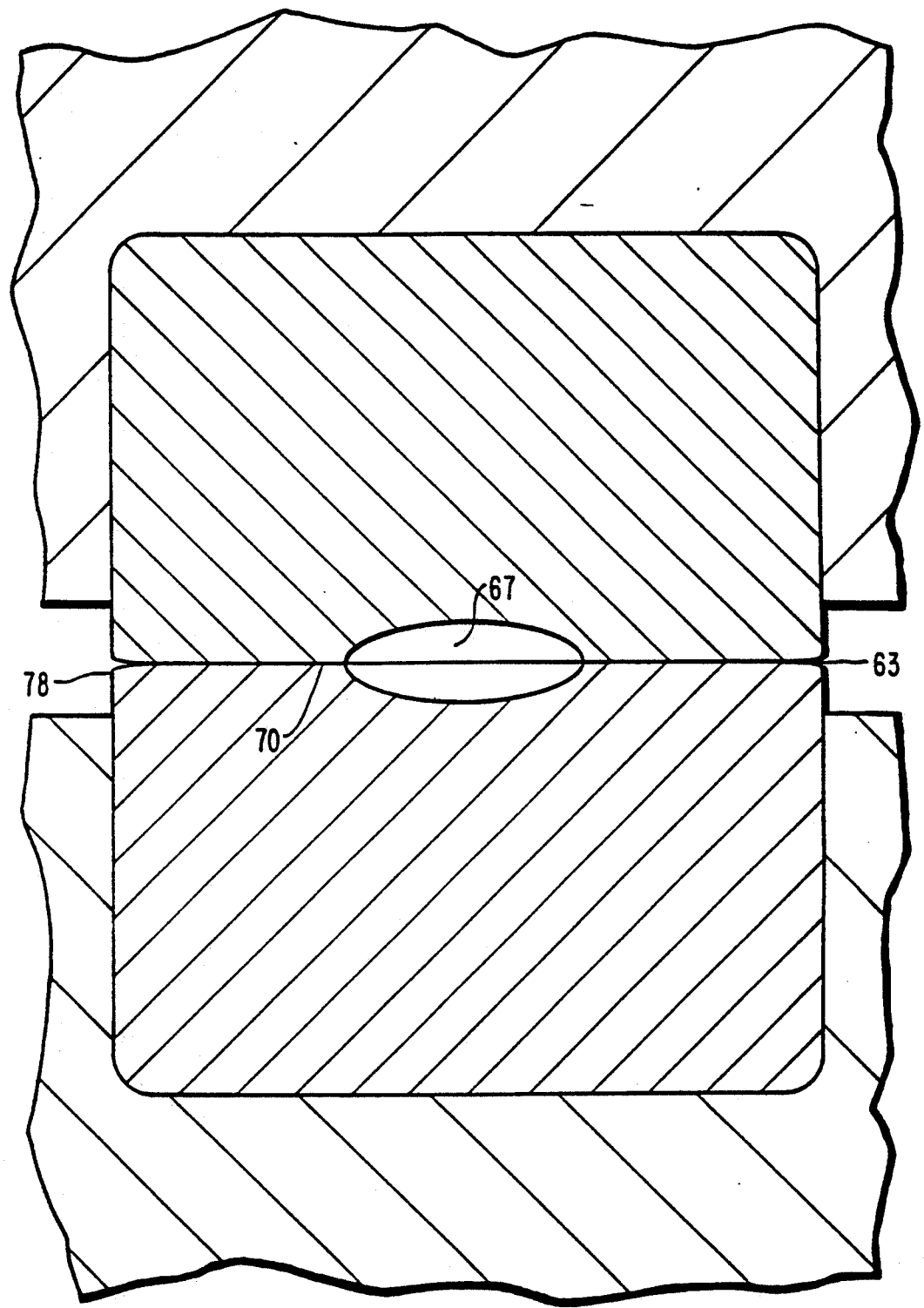
FIG. 16 is a cross-sectional view with the indentation shown on an exaggerated scale taken along line 16—16 of FIG. 5, of two bearing pads in opposed orientation in an assembled load-carrying structure.

The resultant pressure on walls 78 of bearing pad 60 caused by the interference fit distorts bearing face 63 causing bearing face 63 to assume a curved attitude. The substantially planar effective bearing contact surface 70 becomes more convex as shown by comparing the distorted profile shown in solid lines with the undistorted pad prior to insertion as shown in dashed lines in FIG. 15. This convex distortion is alleviated, however, when a counter-directed pressure is applied to the load-carrying structure by the opposed load carrying structure as shown in FIG. 16. The effect of this counter-directed pressure causes bearing face 63, and more specifically, effective bearing contact surface 70 to become flattened, thereby obviating the deleterious effect of the convexity caused by the interference fit.

As can be seen in the alternate embodiments illustrated in FIGS. 17A–17G, the invention may perform its many functions in several configurations and is not limited to the circular shape shown in FIGS. 6–16.

Figure 17A:
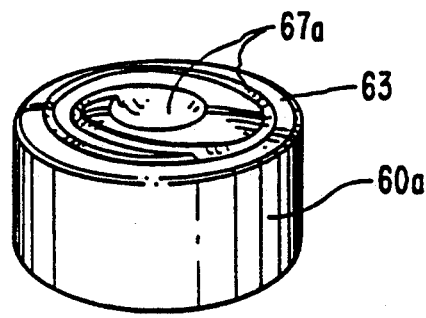
FIGS. 17A through 17G are perspective views of alternate embodiments of the invention.

For example, in FIG. 17A, a bearing pad 60a is depicted utilizing an indentation 67a that takes the form of a central recess connected to a spiral groove capable of performing the functions of the present invention.

Figure 17B:
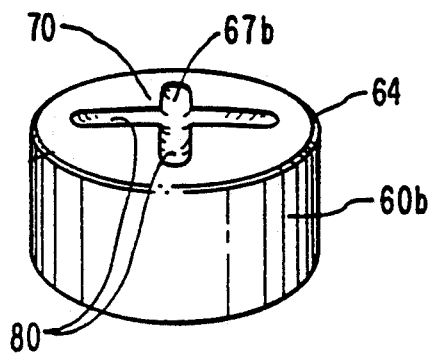

In FIG. 17B, a bearing pad 60b is depicted utilizing an indentation 67b which is comprised of a pair of troughs 80 intersecting at right angles to each other. Drilling fluid does not flow through troughs 80, but is retained therein and replenished when indentation 67b passes across space 57.

Figure 17C:
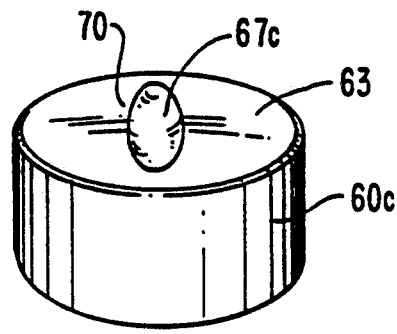

FIG. 17C depicts a bearing pad 60c having an oval indentation 67c. As effective bearing contact surface 70 is rotated against the opposed effective bearing contact area of the opposed bearing face, more heat will be generated in the portions of surface 70 that pass across the wider mid-portions of the opposed surface. Oval indentation 67c addresses that situation by providing more recess surface to cool these warmer areas.

Since no apex remains in any of the embodiments shown in FIGS. 17A–17G, loads are instead borne across the much wider surface area of effective bearing contact surface 70. Any heat generated from that contact will be absorbed into the drilling fluid in the various embodiments of indentation 67 shown in the figures.

Figure 17D:
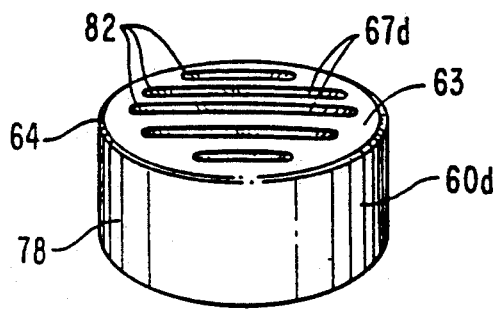

FIG. 17D depicts a bearing pad 60d with an indentation 67d comprising a series of parallel grooves 82 formed within periphery 64 of bearing face 63.

As used in this specification, the term "formed within periphery" used vis-a-vis an indentation encompasses indentations that do not have any portion that perforates periphery 64. By way of illustration, grooves 82 in FIG. 17D are formed in bearing face 63 and do not extend through periphery 64 or wall 78.

Figure 17E:
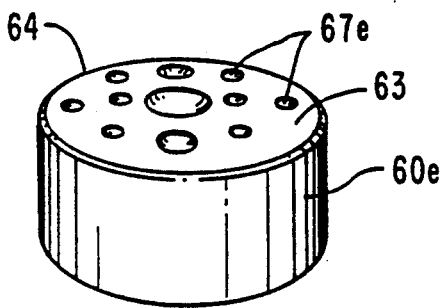

FIG. 17E illustrates a bearing pad 60e with indentations 67e both centrally located and randomly situated about bearing face 63. Benefits afforded by this configuration derive from the shortened distance that heat must travel before encountering a fluid-filled recess. Upon encountering recesses 67e, heat will dissipate, and the drilling fluid contained therein will expand providing lubrication to the opposed bearing faces as discussed previously.

Figure 17F:
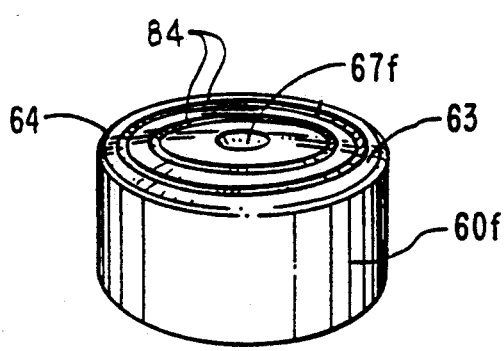

FIG. 17F depicts a bearing pad 60f with a centrally-located circular indentation 67f surrounded by a series of concentric grooves 84. Reference to FIG. 17F reveals that concentric grooves 84 do not perforate periphery 64 and are, therefore, formed within periphery 64.

Figure 17G:
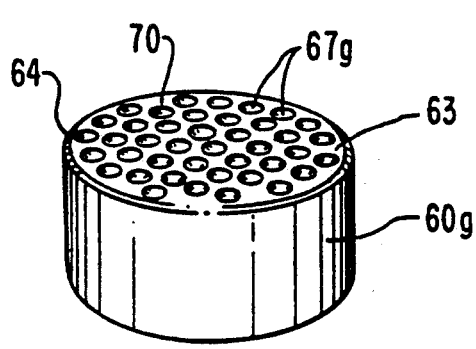

FIG. 17G illustrates a bearing pad 60g having a plurality of uniform indentations 67g, "formed within the periphery" of bearing pad 60g. Because of the very high strength of polycrystalline diamond, the reduced effective bearing contact area 70 may still be sufficient to function as a diamond thrust bearing in many situations. The additional cooling imparted by the plurality of recesses 67g will give bearing face 63 improved thermal stability.

The present invention reduces downtime from repairs by providing a thrust bearing assembly that has a useful life equal to or exceeding the useful life of diamond drill bits. This allows both structures to be replaced at the same time thereby avoiding downtime of equipment for separate replacement of the structures. This allows the leased drilling machinery to be in productive use for a longer portion of the lease thereby reducing the costs of exploration and the costs of petroleum products to consumers.

The present invention reduces the effect of point loading by effectively spreading the loading over a comparatively large effective bearing contact surface. This is accomplished by removing the apex of the bearing face and replacing the apex with an indentation. The surface area of the perimeter of the indentation is must larger than the surface area of a single apex.

To further reduce the heat produced, the area surrounding the indentation is lapped to provide a large effective bearing contact surface. As the resultant surface greatly multiplies the area of contact, the heat generated is greatly reduced. This reduction prevents the polycrystalline diamond bearing surface from being exposed to the effects of deleterious heat and thereby increases the useful life of the bearing pad.

In addition to reducing the heat produced at any one point, the present invention also controls the path that heat travels. In the past, heat generated in the center of the bearing face at the apex travelled to the periphery of the bearing face. The periphery of the pad was the coolest point as it was cooled by the constant flow of drilling fluid. The present invention provides a reservoir means formed in a portion of the bearing face for retaining a material when that portion of the bearing face is occluded. By retaining drilling fluid near the area of contact between bearing pads, heat generated in the bearing face opposing the bearing face with the reservoir means is dissipated into the reservoir means instead of traveling across the bearing face and exposing the bearing face to the effects of the heat.

The invention also provides a temperature modulation means which when filled with a material that has a higher heat storage capacity than the bearing face allows more heat to be retained near the center of the bearing face. By storing this heat and then releasing the heat upon contact with the flow of quenching drilling fluid, the heat is prevented from traveling across the bearing face.

An additional feature of the present invention that reduces heat production is the lubricating means provided to the bearing faces by the indentation even when it is occluded. By applying lubrication to the bearing face during its entire passage across an opposing bearing face, friction is reduced thereby reducing the heat produced by contact between the bearing pads.

By utilizing the indentation in the bearing face, heat production is greatly reduced. As a result, the flow of drilling fluid can be greatly reduced. Some bearing pads of the past required a destructively high flow rate to ensure that drilling fluid passed through channels carved in the bearing faces. The present invention requires only enough flow to fill the indentation as the indentation passes across the space between the bearing pads. This greatly reduces the flow required, and therefore, the erosion of the bearing pads resulting from that flow.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A bearing pad employable in a thrust bearing as one of a plurality of bearing pads in a bearing pad retainer, the bearing pad having an insertion end fixed in one of two opposed bearing pad retainers, the bearing pad retainers rotatable relative to another, the bearing pad having an exposed bearing end projecting from the bearing pad retainer and terminating in a bearing face having a periphery, so that the bearing faces of bearing pads in one bearing pad retainer are in contact with the bearing faces of the bearing pads in the other bearing pad retainer, said bearing pad comprising:
   (a) an effective bearing contact surface formed in said bearing face; and
   (b) reservoir means formed within the periphery of said bearing face for retaining a material when said portion of said bearing face is occluded by a bearing face of an opposing bearing pad.

2. A bearing pad as recited in claim 1, wherein said effective bearing contact area is substantially planar and wherein said reservoir means is formed centrally therein.

3. A bearing pad as recited in claim 1, wherein said reservoir means comprises an indentation formed in said bearing face.

4. A bearing pad as recited in claim 3, wherein a floor of said indentation is concave.

5. A bearing pad as recited in claim 1, wherein said material retained in said reservoir means is drilling fluid.

6. A bearing pad as recited in claim 1, wherein said reservoir means comprises a plurality of indentations arranged about said bearing face.

7. A bearing pad employable in a thrust bearing as one of a plurality of bearing pads in bearing pad retainers rotatable relative to another, the bearing pad having an insertion end fixed in one of two opposed bearing pad retainers and having an exposed bearing end projecting from the bearing pad retainer and terminating in a bearing face, so that the bearing faces of bearing pads in one bearing pad retainer are in contact with the bearing faces of the bearing pads in the other bearing pad retainer, said bearing pad comprising:
   (a) an effective bearing contact area formed in the bearing face; and
   (b) stabilizing means for increasing the effectiveness of a lapping process used to flatten said effective bearing contact area of the bearing face, said stabilizing means comprising the perimeter of an indentation centrally located in the bearing face.

8. A load-carrying structure for a thrust bearing, the load-carrying structure being contacted by and rotatable relative to an opposed load-carrying structure having bearing pads fixed in a bearing pad retainer, said load-carrying structure comprising:
   (a) a bearing pad retainer having a plurality of bearing pad recesses formed in a receiving surface thereof; and
   (b) a plurality of bearing pads, each bearing pad having an insertion end fixed in a corresponding bearing pad recess and a bearing end extending from said bearing pad retainer and terminating in a bearing face, said bearing face comprising:
      (i) a periphery encircling said bearing face;
      (ii) a annular flattened area, said flattened area forming an effective bearing contact surface; and
   (c) heat dissipation enhancement means in said bearing face, said heat dissipation enhancement means comprising a plurality of indentation formed within the periphery of said bearing face, said indentations being filled with drilling fluid and being arranged about said bearing face to afford a conductive path shorter than the conductive path between said effective bearing contact surface and said periphery of said bearing face.

9. A load-carrying structure for a thrust bearing, the load-carrying structure being contacted by and rotatable relative to an opposed load-carrying structure having bearing pads fixed in a bearing pad retainer, said load-carrying structure comprising:
   (a) a bearing pad retainer having a plurality of bearing pad recesses formed in a receiving surface thereof; and
   (b) a plurality of bearing pads, each bearing pad having an insertion end fixed in a corresponding bearing pad recess and a bearing end extending from said bearing pad retainer and terminating in a bearing face, said bearing face comprising:
      (i) a periphery encircling said bearing face;
      (ii) an indentation having a perimeter formed centrally in said bearing face, said perimeter forming an effective bearing contact area between said bearing face and a bearing face of the opposed bearing pad.

10. A load-carrying structure as recited in claim 9, wherein said plurality of bearing pads is cooled by drilling fluid flowing at a low pressure.

11. A load-carrying structure for a thrust bearing, the load-carrying structure being contacted by and rotatable relative to an opposed load-carrying structure having bearing pads fixed in a bearing pad retainer, said load-carrying structure comprising:
   (a) a bearing pad retainer having a plurality of bearing pad recesses formed in a receiving surface thereof; and
   (b) a plurality of bearing pads, each bearing pad having an insertion end fixed in a corresponding bearing pad recess and a bearing end extending from said bearing pad retainer and terminating in a bearing face, said bearing face comprising:
      (i) a periphery encircling said bearing face;
      (ii) an indentation having a perimeter formed centrally in said bearing face; and
      (iii) a annular flattened area encircling said indentation, said annular flattened area forming an effective bearing contact surface between an outer border of said annular flattened area and said perimeter of said indentation.

12. A load-carrying structure as recited in claim 11, wherein said annular flattened area is formed by lapping.

13. A load-carrying structure for a thrust bearing, the load-carrying structure being contacted by and rotatable relative to an opposed load-carrying structure having bearing pads fixed in a bearing pad retainer, said load-carrying structure comprising:
   (a) a bearing pad retainer having a plurality of bearing pad recesses formed in a receiving surface thereof;
   (b) a plurality of bearing pads, each bearing pad having an insertion end fixed in a corresponding bearing pad recess and a bearing end extending from said bearing pad retainer and terminating in a bearing face having a periphery; and
   (c) reservoir means formed within the periphery of said bearing face for retaining drilling fluid when said portion of said bearing face is occluded by a bearing face of the bearing pad in the opposing bearing pad retainer.

14. A load-carrying structure as recited in claim 13, wherein said reservoir means is located centrally in said bearing face.

15. A load-carrying structure as recited in claim 13, wherein said reservoir means is circular and is centrally located in said bearing face.

16. A load-carrying structure as recited in claim 13, wherein said reservoir means comprises a plurality of circular indentations formed in said bearing face.

17. A load-carrying structure as recited in claim 13, wherein said reservoir means comprises a transverse groove formed in said bearing face, said transverse groove extending from a point within said periphery of said bearing face to another point within said periphery of said bearing face.

18. A load-carrying structure as recited in claim 13, Wherein said reservoir means comprises a series of intersecting grooves formed in said bearing face, said intersecting grooves extending from a point within said periphery of said bearing face to another point within said periphery of said bearing face.

19. A load-carrying structure as recited in claim 13, wherein said reservoir means comprises an oval indentation in said bearing face.

20. A load-carrying structure as recited in claim 13, wherein said reservoir means comprises a circular groove concentric with said periphery of said bearing face.

21. A load-carrying structure as recited in claim 13, wherein said reservoir means comprises an indentation capable of retaining drilling fluid flowing at a low pressure.

22. A load-carrying structure for a thrust bearing, the load-carrying structure being contacted by and rotatable relative to an opposed load-carrying structure having bearing pads fixed in a bearing pad retainer, said load-carrying structure comprising:
(a) a bearing pad retainer having a plurality of bearing pad recesses formed in a receiving surface thereof;
(b) a plurality of bearing pads, each bearing pad having an insertion end fixed in a corresponding bearing pad recess and a bearing end extending from said bearing pad retainer and terminating in a bearing face having a periphery; and
(c) temperature modulation means formed in said bearing face for storing heat produced at said bearing face, said temperature modulation means comprising an indentation formed within the periphery of said bearing face retaining drilling fluid when said indentation is occluded by a bearing face of an opposing bearing pad in the opposing bearing pad retainer.

23. A load-carrying structure for a thrust bearing, the load-carrying structure being contacted by and rotatable relative to an opposed load-carrying structure having bearing pads fixed in a bearing pad retainer, said load-carrying structure comprising:
(a) a bearing pad retainer having a plurality of bearing pad recesses formed in a receiving surface thereof;
(b) a plurality of bearing pads, each bearing pad having an insertion end fixed in a corresponding bearing pad recess and a bearing end extending from said bearing pad retainer and terminating in a bearing face having a periphery; and
(c) lubricating means in said bearing face for providing lubrication to the opposed bearing face of the opposed bearing pad when said bearing face is occluded by contact with the opposed bearing face of the opposed bearing pad, said lubricating means comprising an indentation formed within the periphery of said bearing face and a lubricating fluid, said indentation being capable of retaining the lubricating fluid.

24. A load-carrying structure as recited in claim 23, wherein said indentation is refilled as said indentation is rotated to a position wherein said indentation is not totally occluded by contact with the bearing face of said opposed bearing pad.

25. A load-carrying structure as recited in claim 23, wherein said lubricating fluid comprises drilling fluid.

26. A load-carrying structure for a thrust bearing, the load-carrying structure being contacted by and rotatable relative to an opposed load-carrying structure having bearing pads fixed in a bearing pad retainer, said load-carrying structure comprising:
(a) a bearing pad retainer having a plurality of bearing pad recesses formed in a receiving surface thereof; and
(b) a plurality of bearing pads, each bearing pad having an insertion end fixed in a corresponding bearing pad recess and a bearing end extending from said bearing pad retainer and terminating in a bearing face, said bearing face comprising:
 (i) a periphery encircling said bearing face;
 (ii) a annular flattened area, said flattened area forming an effective bearing contact surface; and
(c) heat dissipation enhancement means in said bearing face for reducing the length of a path of heat produced at said bearing face when said heat is conducted to cooler areas of said bearing face, said heat dissipation enhancement means comprising a centrally located indentation containing drilling fluid.

* * * * *